J. B. Sherlock,
Stalk Cutter.
No. 96,042. Patented Oct. 19, 1869.

Witnesses:
N. D. Corken
W. L. Carroll

Inventor:
John B Sherlock

United States Patent Office.

JOHN B. SHERLOCK, OF PORT BYRON, ILLINOIS.

Letters Patent No. 96,042, dated October 19, 1869.

IMPROVEMENT IN CORN-STALK CUTTER.

The Schedule referred to in these Letters Patent and making part of the same.

*To all whom it may concern:*

Be it known that I, JOHN B. SHERLOCK, of Port Byron, in the county of Rock Island, and State of Illinois, have invented certain new and useful Improvements in a Corn-Stalk Cutter; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to corn-stalk cutters; and consists in a novel manner of constructing and arranging the same, as hereinafter described.

In the drawings—

Figure 1:
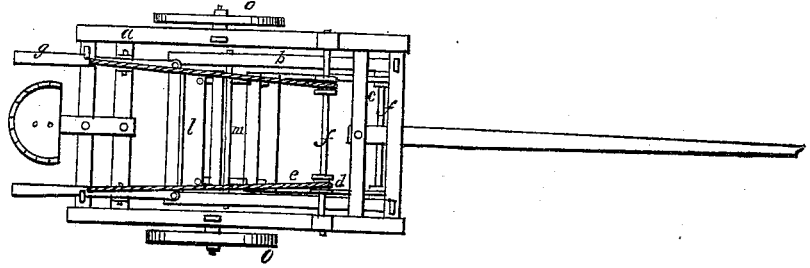
Figure 1 is a top plan view of the machine.
Figure 2:
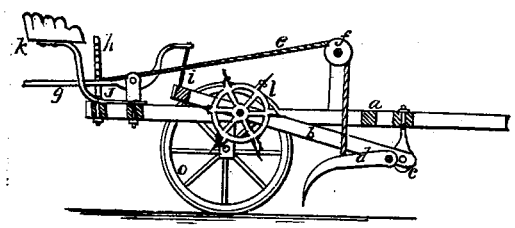
Figure 2 is a longitudinal vertical section through the centre of the same, the drag-bars and cutter being raised, and the machine ready for transportation.
Figure 3:
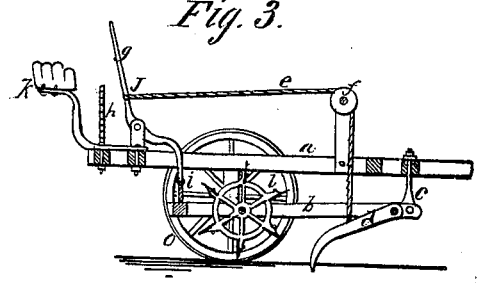
Figure 3 is a longitudinal vertical section of the machine, with the drag-bars and cutter lowered for operation.

In building my machine, I construct a rectangular frame, $a$, provided with a tongue, and mount it on two wheels, $o$, all as shown in figs. 1, 2, and 3.

Under and to the frame $a$, I hinge a smaller frame, $b$, supported at its front end by the depending links or bars $c$, all as shown in figs. 2 and 3.

The rear end of this frame $b$ is free to rise and fall, and is connected at its rear corners, by cords $i$, with levers $g$. These levers $g$ are pivoted to uprights on the frame $a$, near its rear end, and are located one on each side of the frame, as shown.

By depressing the rear ends of either of the levers $g$, the rear end of the frame may be elevated, as shown in fig. 2.

Back of each of the levers $g$, I station a rack, $h$, by which the levers are locked down.

Across in the rear end of the frame $b$, I mount a shaft, $m$, provided near each end with a circular disk or skeleton.

To the peripheries of these disks, I secure knives or blades $l$, these blades extending across from one disk to the other, and having one end secured to each, all as shown in figs. 1, 2, and 3; the whole forming a cylinder of knives.

Across the forward end of the frame $b$, I secure a rod or shaft, $c$, and pivot loosely on it, near each end, a drag-bar, $d$, as shown in figs. 1, 2, and 3. These drag-bars are curved or hooked, as shown, and are of sufficient length to reach back near the cutting-cylinder, and when lowered drag upon the ground in front of said cutter.

On each side of the frame $a$, near its front end, I erect a standard, as shown, and mount between these standards a horizontal shaft, $f$, as shown in figs 1, 2, and 3.

On the shaft $f$, directly over the drag-bars, I place pulleys, $p$.

To each of the drag-bars I attach a chain or cord, $e$, and pass it up over the corresponding pulley $p$, and thence back to the lever $g$ on the same side of the frame.

When thus connected, it will be seen that if the parts be in the position shown in fig. 3, and one of the levers $g$ drawn back, the frame $b$ and one of the drag-bars will be raised; and by operating the remaining lever, the other drag-bar may also be elevated. The machine is then ready for transportation to or from the field, and may be moved around as readily as an ordinary cart.

Upon releasing the levers $g$, the frame $b$ and drag-bars $d$ will be lowered, and the cylinder of knives allowed to roll on the ground.

When the parts are in the position shown in fig. 3, if the machine be driven across the field, the drag-bars will pull up the stalks, and straighten them around, and the cylinder of knives, following after and rolling over, will cut them into short pieces, which may be readily turned under in plowing.

On the rear end of the frame I locate a seat, $k$, for the driver, who can reach and operate both levers without removing from it.

If desired, one of the levers $g$ may be dispensed with, and a shaft extended across the frame, with a lever on one end, and an arm on the other, and both rigid on the shaft.

My machine possesses great advantages over others, for the reason that the cutter and drag-bars may be raised, and the machine turned without the driver dismounting, thus enabling him to manage his team, and also avoiding the great fatigue resulting from climbing up and down from his seat at each turn of the machine.

Having thus described my invention,

What I claim, is—

The combination and arrangement of the lever $g$, connected to the frame $b$, and the cord $e$, attached to the drag-bars $d$, whereby both the stalk-cutter and the drag-bars are raised or lowered simultaneously, as set forth.

JOHN B. SHERLOCK.

Witnesses:
N. D. CORKEN,
W. L. CARROLL.